US011895196B1

(12) United States Patent
Herrero

(10) Patent No.: US 11,895,196 B1
(45) Date of Patent: Feb. 6, 2024

(54) EFFICIENT UPDATE MECHANISM IN IOT EVENT DRIVEN ARCHITECTURES

(71) Applicant: Johnson Controls Tyco IP Holdings LLP, Milwaukee, WI (US)

(72) Inventor: Rolando Herrero, Amherst, NH (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 18/305,016

(22) Filed: Apr. 21, 2023

(51) Int. Cl.
G06F 15/16 (2006.01)
H04L 67/142 (2022.01)
G06F 8/61 (2018.01)
H04L 9/40 (2022.01)

(52) U.S. Cl.
CPC .......... H04L 67/142 (2013.01); G06F 8/61 (2013.01); H04L 63/0236 (2013.01)

(58) Field of Classification Search
CPC ...... H04L 67/142; H04L 63/0236; G06F 8/61
USPC ........................................................ 709/228
See application file for complete search history.

(56) References Cited

U.S. PATENT DOCUMENTS 11,296,933 B1 * 4/2022 Herrero ................ G16Y 30/10
11,356,814 B1 * 6/2022 Choi ..................... H04W 4/029
2016/0154692 A1 * 6/2016 Heinz ................ G06F 11/0772
714/2
2021/0364597 A1 * 11/2021 Sheriff ................. G01S 13/765
2023/0007097 A1 * 1/2023 Ly .......................... H04L 67/12
2023/0042583 A1 * 2/2023 Novo Diaz ........... H04L 1/1835

OTHER PUBLICATIONS

AWS IoT Core: Developer Guide; Using AWS IoT MQTT-based file delivery in devices—AWS IoT Core (amazon.com), pp. 1-394; 905-1006.

* cited by examiner

*Primary Examiner* — Alan S Chou
(74) *Attorney, Agent, or Firm* — ArentFox Schiff LLP

(57) ABSTRACT

Example aspects include techniques for efficient updates in IoT event driven architectures. These techniques may include receiving, from a source application via a publish/subscribe broker service a first block using a first IoT messaging session, the first block including a first portion of a file and a first plurality of communication parameters, and transmitting a first acknowledgement corresponding to the first block, the first acknowledgement approving a proposed parameter of the first plurality of communication parameters. Further, the techniques may include receiving, based on the proposed parameter, from the source application via the publish/subscribe broker service, a second block using a second IoT messaging session, the second block including a second portion of the file and a second plurality of communication parameters, and transmitting a second acknowledgement corresponding to the second block.

20 Claims, 8 Drawing Sheets

EFFICIENT UPDATE MECHANISM IN IOT EVENT DRIVEN ARCHITECTURES

FIELD OF TECHNOLOGY

The present disclosure relates generally to internet of thing (IoT) devices, and more particularly, to methods and systems for efficient updates in IoT event driven architectures.

BACKGROUND

REpresentational State Transfer (REST) APIs are often employed for communications between remote applications and IoT devices. For example, traditional update mechanisms (e.g., firmware updates, file updates, database updates, etc.) may rely on REST interactions between a management application and an IoT device. Further, many IoT devices have adopted event driven architectures (EDA) where the message queuing telemetry transport (MQTT) protocol/topology is used for session management. However, REST is not intended to support EDA scenarios.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method performed by an internet of things (IoT) device, the method including: receiving, from a source application via a publish/subscribe broker service, a first block using a first IoT messaging session, the first block including a first portion of a file and a first plurality of communication parameters; transmitting a first acknowledgement corresponding to the first block, the first acknowledgement approving a proposed parameter of the first plurality of communication parameters, including one or more of the first plurality of communication parameters, and indicating receipt of the first block; receiving, based on the proposed parameter, from the source application via the publish/subscribe broker service, a second block using a second IoT messaging session, the second block including a second portion of the file and a second plurality of communication parameters; and transmitting a second acknowledgement corresponding to the second block, the second acknowledgement including one or more of the second plurality of communication parameters, and indicating receipt of the second block.

In some aspects, the techniques described herein relate to a system including: a memory storing instructions thereon; and at least one processor coupled to the memory and configured by the instructions to: receive, from a source application via a publish/subscribe broker service, a first block using a first IoT messaging session, the first block including a first portion of a file and a first plurality of communication parameters; transmit a first acknowledgement corresponding to the first block, the first acknowledgement approving a proposed parameter of the first plurality of communication parameters, including one or more of the first plurality of communication parameters, and indicating receipt of the first block; receive, based on the proposed parameter, from the source application via the publish/subscribe broker service, a second block using a second IoT messaging session, the second block including a second portion of the file and a second plurality of communication parameters; and transmit a second acknowledgement corresponding to the second block, the second acknowledgement including one or more of the second plurality of communication parameters, and indicating receipt of the second block.

In some aspects, the techniques described herein relate to a non-transitory computer-readable device having instructions thereon that, when executed by at least one computing device, causes the at least one computing device to perform operations including: transmitting, to an internet of things (IoT) device via a publish/subscribe broker service, a first block a first IoT messaging session, the first block including a first portion of a file and a first plurality of communication parameters including a proposed parameter; receiving a first acknowledgement corresponding to the first block, the first acknowledgement approving the proposed parameter, including one or more of the first plurality of communication parameters, and indicating receipt of the first block; transmitting, based on the proposed parameter, to the IoT device via the publish/subscribe broker service, a second block using a second IoT messaging session, the second block including a second portion of the file and the second plurality of communication parameters; and receiving a second acknowledgement corresponding to the second block, the second acknowledgement including one or more of the second plurality of communication parameters, and indicating receipt of the second block.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
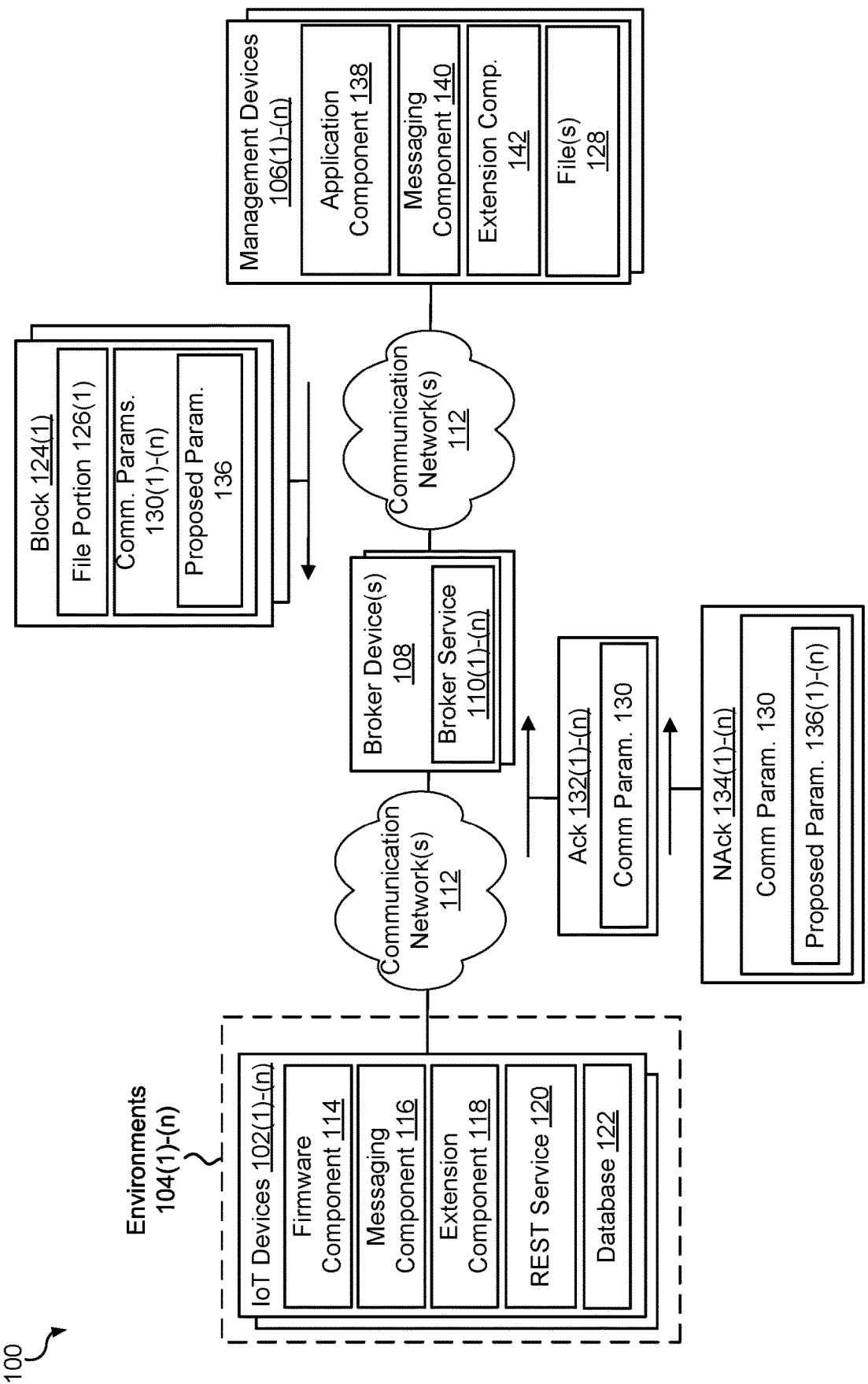
FIG. 1 is a block diagram of an example of a system for efficient updates in IoT event driven architectures, according to some implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide efficient updates in IoT event driven architectures. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one or more problems solved by the present solution are protocol incompatibility, protocol size limitations, data communications reliability, and delayed processing due to congestion. For example, this present disclosure describes systems and methods for efficient updates in IoT event driven architectures by splitting a file into different portions that are smaller than protocol limitations of an EDA and approved by a recipient device, and managing transmission of each portion via a dynamically-allocated EDA communication session. Further, in some aspects, the present disclosure describes using a local REST interaction to enable a REST based installation in an EDA implementation. As such, the present disclosure extends EDA without requiring changes to standard EDA (e.g., MQTT) implementations to include transmission of large files with transfer progress and congestion control, and file installation on legacy devices configured to perform updates via REST.

Referring to FIG. 1, in one non-limiting aspect, a system 100 may be configured to provide efficient updates in IoT EDAs. As illustrated in FIG. 1, the system 100 may include one or more IoT devices 102(1)-(n) each deployed in an environment 104 of a plurality of environments 104(1)-(n), one or more management devices 106(1)-(n) configured to manage the IoT devices 102(1)-(n), one or more broker devices 108(1)-(n) each including one or more broker services 110 for brokering messages between the IoT devices 102(1)-(n) and the management devices 106(1)-(n), and one or more communication networks 112. In some aspects, each environment 104 may include one or more IoT devices 102. Further, the management devices 106(1)-(n) may repair and/or manage the IoT devices 102(1)-(n). Further, the IoT devices 102(1)-(n), the management devices 106(1)-(n), and/or the broker devices 108(1)-(n) may communicate via the communication networks 112. In some implementations, the communication networks 112 may include one or more of a wired and/or wireless private network, personal area network, local area network, wide area network, or the Internet.

As used herein, in some aspects, the "internet of things" may refer to the interconnectivity of identifiable devices via the Internet. Some examples of the IoT devices 102(1)-(n) may include embedded devices, control panels (e.g., fire alarm controls panels, HVAC control panels, security panels), meters (e.g., a utility meter, a parking meter, etc.), sensors (e.g., a temperature sensor, an accelerometer, a heat sensor, a motion detector, etc.), readable tags, cameras, antennae, or any other device that can collect, obtain, and/or generate data and forward the data.

In some aspects, the IoT device 102 may include a firmware component 114, a messaging component 116, an extension component 118, a REST service 120, and a database 122. The firmware component 114 may be configured to operate the IoT device 102. For example, the firmware component 114 may be configured to manage data collection and/or event generation by the IoT device 102, and data transfer by the IoT device 102. In some aspects, the firmware component 114 may provide sensor logic, meter logic, panel logic, camera logic, telecommunications logic, etc.

The messaging component 116 may be configured to perform a message exchange with a management device 106. For example, in some aspects, the messaging component 116 may be configured to facilitate receipt of a firmware update from a management device 106 via a message exchange, receive updated authentication/authorization information from a management device 106 via a message exchange, or transmit event data to the management device 106 via a message exchange. In some aspects, the messaging component 116 implements an event driven architecture for message passing, e.g., MQTT. As used herein, in some aspects, "MQTT" may refer to a lightweight messaging protocol based on publish/subscribe model, specifically designed for IoT applications in low bandwidth and unstable network environments. Further, the messaging component 116 may provide a retransmission and duplicate message discovery mechanism that is designed to ensure that messages reach the destination and arrive exactly once (i.e., quality of service (QoS) level 2). Additionally, in some aspects, the messaging component 116 may configure the IoT device 102 to act as a publisher, subscriber, or a broker within a publish/subscribe architecture.

As described herein, in some aspects, the messaging component 116 may not be configured to support block transfers and therefore is unable to receive a file that has been split into two or more parts over a single session of the messaging component 116. Further, the messaging component 116 may not be configured to transmit or receive files over a limited size (e.g., approximately 260 megabytes). However, the extension component 118 may be configured to manage receipt of a file in two or more parts via the messaging component 116 over multiple communication sessions of the messaging component 116. For instance, the extension component 118 may be configured to establish parameters for message exchange, acknowledge receipt of different parts of a file across multiple sessions, and organize reconstitution of the file based on the different parts.

For example, a management device 106 may send a plurality of blocks 124 to the messaging component 116. Further, each block 124 may include a file portion 126 that is a unique part of a file 128, and a plurality of communication parameters 130(1)-(n) for managing receipt of the file 128 across multiple sessions of the messaging component 116. In response to a block 124, the extension component 118 may generate an acknowledgement 132 or a negative acknowledgement 134 to the block 124. The acknowledgement 132 or the negative acknowledgement 134 may also include one or more of the communication parameters 130(1)-(n). Further, the extension component 118 may transmit the acknowledgement 132 or the negative acknowledgement 134 to the management device 106 via the messaging component 116.

Some examples of the communication parameters 130(1)-(n) include a requested size for the blocks used to transmit a file, a message type identifier, a block identifier of the block, a length of the block, an offset position of a block within the file, and/or a target of the file. In some aspects, a message type identifier may indicate whether a message is a block 124, an acknowledgement 132, or a negative acknowledgement 134. In some aspects, the target may indicate a function/method/application or location for processing and/or storing the file once the blocks for the file are received. For example, the target may be a uniform resource locator (URL) indicating a storage location of the file 128. In some aspects, the communication parameters 130(1)-(n) may be encoded. For example, the communication parameters 130 may be encoded as type-length-value (TLV) fields, concise binary object representation (CBOR) fields, or universal binary JSON (UNJSON) fields.

In some aspects, the plurality of communication parameters 130(1)-(n) may include one or more proposed parameters 136 (e.g., the requested size of the block) for messages exchanged between an IoT device 102 and a management device 106. For example, a first block 124 transmitted by the management device 106 to the IoT device 102 may include a proposed parameter 136. Further, the extension component 118 may determine whether the proposed parameter 136 is suitable for communications between the IoT device 102 and the management device 106. For example, the proposed parameter 136 may be a requested size of each block corresponding to a file 128, and the extension component 118 may determine whether the requested size is too large based upon the memory attributes of the IoT device 102 and/or an activity currently performed or to be performed by the IoT device 102.

If the extension component 118 determines that the proposed parameter 136 is suitable, the extension component 118 may transmit an acknowledgement 132 to the management device 106. If the extension component 118 determines that the proposed parameter 136 is unsuitable, the extension component 118 may transmit a negative acknowledgement 134 to the management device 106. Further, the negative acknowledgement 134 may include an updated proposed parameter 136 that is different from the original proposed parameter 136 of the block 124 corresponding to the negative acknowledgement 134. In some aspects, the extension component 118 determines the updated proposed parameter 136 based on the memory attributes of the IoT device 102 and/or an activity currently performed or to be performed by the IoT device 102. For example, if the original proposed parameter 136 is a first requested block size and the extension component 118 determines that the first requested block size is too large, the extension component 118 may select a second requested block size of a smaller value as the updated proposed parameter 136. Further, the extension component 118 may include the updated proposed parameter 136 within the negative acknowledgement 134.

Further, the extension component 118 may determine when all of the blocks 124 associated with a file 128 are received. In some aspects, the extension component 118 may track progress of file receipt based on the communication parameters 130. For example, the extension component 118 may track the block identifiers of the blocks 124 received by the messaging component 116, the length of the blocks 124 received by the messaging component 116, and an offset position of blocks 124 within the file to determine if all of the blocks 124 associated with a file 128 have been received by the messaging component 116.

In addition, in some aspects, the extension component 118 may trigger processing of a file 128 by managing provision of the file 128 to a higher protocol layer within the IoT device 102. Additionally or alternatively, the extension component 118 may store the blocks 124 as a file 128 at a storage location identified as a target within the communication parameters 130 or provide the file to a process identified as a target within the communication parameters 130. For example, in some aspects, the file 128 may be a firmware upgrade file, and the process identified by the target may be a process for updating the firmware using the file 128.

The REST service 120 may be configured to perform REST operations (e.g., GET, POST, PUT, PATCH, and DELETE). Further, in some aspects, the extension component 118 may employ the REST service to call a process of the IoT device 102. As an example, in some aspects, the extension component 118 may transmit a REST POST request to an internal address (e.g., a loopback address) of the IoT device 102 that is associated with a particular process, in response to receiving all of the blocks associated with the file. Further, the REST POST request may include the file 128 reconstituted from the blocks 124. In addition, the REST service may handle the REST POST request and provide the file to the associated process. For example, in some aspects, the file 128 may be a firmware upgrade file, and the internal address (e.g., an IP address local to the IoT device 102) may be associated with a process for updating the firmware using the file 128. Further, the REST service may provide the file 128 to the firmware upgrade process in response to the REST POST request received from the extension component 118. In addition, in some aspects, the firmware component 114 and/or REST service 120 may implement a firewall that permits the REST POST request to the internal address and denies REST POST requests to external addresses outside of the IoT device 102.

The database 122 may be configured to organize a collection of data within the IoT device 102. Further, in some aspects, the database 122 may include various types of database services (e.g., relational, non-relational, structured query language (SQL), noSQL) for storing, querying, and updating data. In some aspects, the database 122 may store data employed to implement the logic of the firmware component 114. For example, the IoT device 102 may be an access control panel and the database 122 may include credential information used to validate access control information captured by the access control panel. Further, in some aspects, the file 128 may be updated credential information, and the process identified by the target may be a process for updating the credential information within the database 122 using the file 128.

In some aspects, the management device 106 may include an application component 138, a messaging component 140, an extension component 142, and one or more files 128. In some aspects, the application component 138 may facilitate the installation and/or deployment of the files 140(1)-(*n*) on the IoT device 102. In some aspects, installation or deployment of the file 128 may modify the firmware component 114 of the IoT device 102. Additionally, in some aspects, the application component 138 may update data stored at one or more IoT devices 102, e.g., information stored within a database 122 of the IoT device 102.

The messaging component 140 may be configured to communicate with the plurality of IoT devices 102. For example, in some aspects, the messaging component 140 may be configured to transmit a firmware update to a IoT device 102 via a message exchange, transmit updated authentication/authorization information to one or more IoT devices 102 via a message exchange, or receive event data from an IoT device 102 via a message exchange. In some aspects, the messaging component 140 implements an event driven architecture for message passing, e.g., MQTT. Further, the messaging component 140 may provide a retransmission and duplicate message discovery mechanism that is designed to provide QoS (e.g., QoS levels 1-3). Additionally, in some aspects, the messaging component 140 may configure the management device 106 to act as a publisher, subscriber, or a broker within a publish/subscribe architecture.

As described herein, in some aspects, the messaging component 140 may not be configured to support block transfers and therefore is unable to transmit a file that has been split into two or more parts over a single session of the messaging component 140. Further, the messaging component 140 may not be configured to transmit or receive files over a limited size (e.g., approximately 260 megabytes). However, the extension component 142 may be configured to manage transmission of a file in two or more parts via the messaging component 140 over multiple communication sessions of the messaging component 140. For instance, the extension component 142 may be configured to establish communication parameters 130 for message exchange, transmit different parts of a file 128 across multiple sessions in accordance with the established communication parameters 130, and manage receipt of the acknowledgements 132 and the negative acknowledgements 134 to blocks 124 including the different parts of the file 128.

For example, the extension component 142 may generate the communication parameters 130 and split a file 128 into a plurality of file portions 126 based on the communication parameters 130. Further, the extension component 142 may transmit a plurality of file portions 126 in blocks 124 to an IoT device 102 via the messaging component 140. In some aspects, each block 124 may include a file portion 126 that is a unique part of a file 128, and the generated communication parameters 130(1)-(*n*) for managing transmission of the blocks 124. As described in detail herein, in some aspect, the communication parameters 130 may include proposed parameters 136 and the IoT device 102 may confirm or deny the proposed parameters 136 using an acknowledgement 132 or a negative acknowledgement 134, respectively.

As illustrated in FIG. 1, a broker device 108 may include one or more broker services 110 configured to receive messages from publishers, filter messages, determine the subscribers to a message, and transmit the message to the subscribers. Further, in some aspects, the broker services 110 are completely agnostic to the format or content of the messages that are sent between devices (i.e., the IoT devices 102 and the management devices 106). Further, each block 124, acknowledgement, and negative acknowledgement exchanged between an IoT device 102 and management device 106 may be routed thru a broker service 110.

Figure 2:
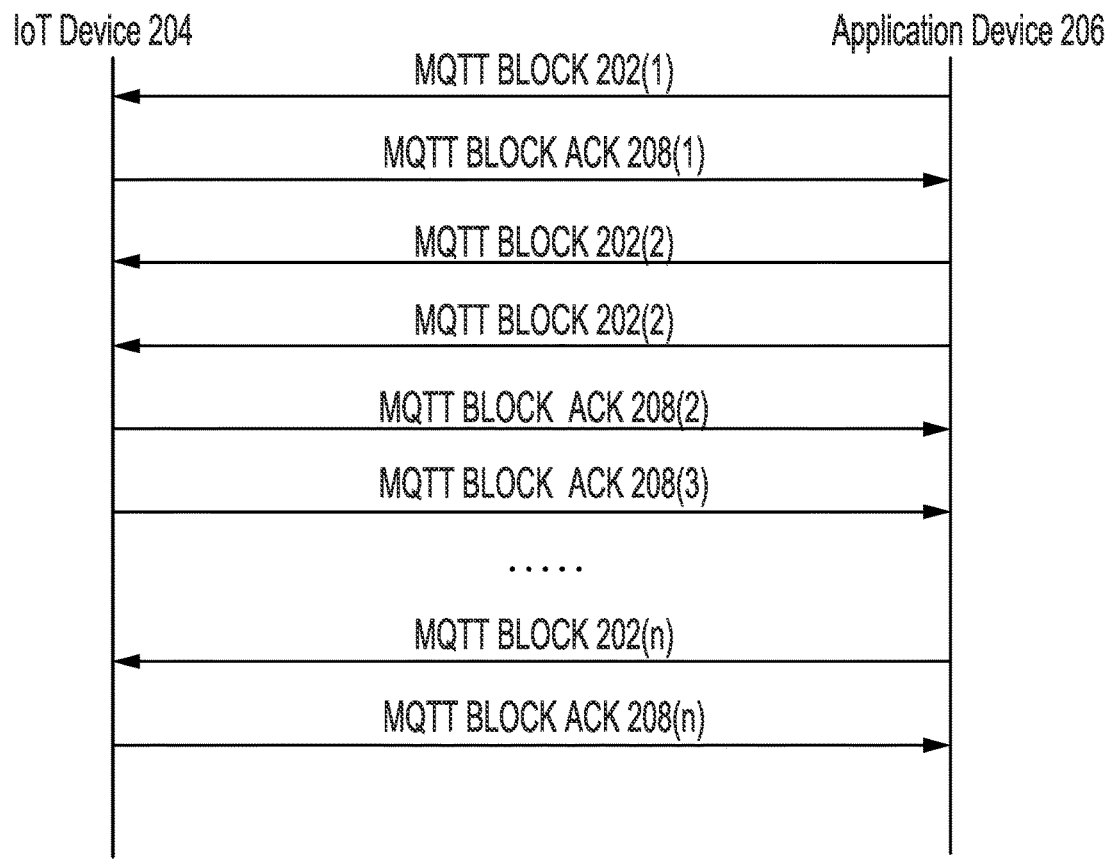
FIG. 2 is a sequence diagram of an example of an efficient update in an IoT event driven architecture, according to some implementations.

FIG. 2 is a sequence diagram of an example of an efficient update in an IoT event driven architecture, according to some implementations. As illustrated in FIG. 2, a plurality of MQTT blocks 202(1)-(*n*) corresponding to a file (e.g., a file 128) may be transmitted by an application device 204 (e.g., a management device 106) to an IoT device 206 (e.g., an IoT device 102), and the IoT device 206 may a send plurality of acknowledgements 208 in response to the plurality of MQTT blocks 202(1)-(*n*). As described with respect to FIG. 1, each of the plurality of MQTT blocks 202(1)-(*n*) may include a file portion (e.g., a file portion 126), and a plurality of communication parameters (e.g., the communication parameters 130).

Figure 3:
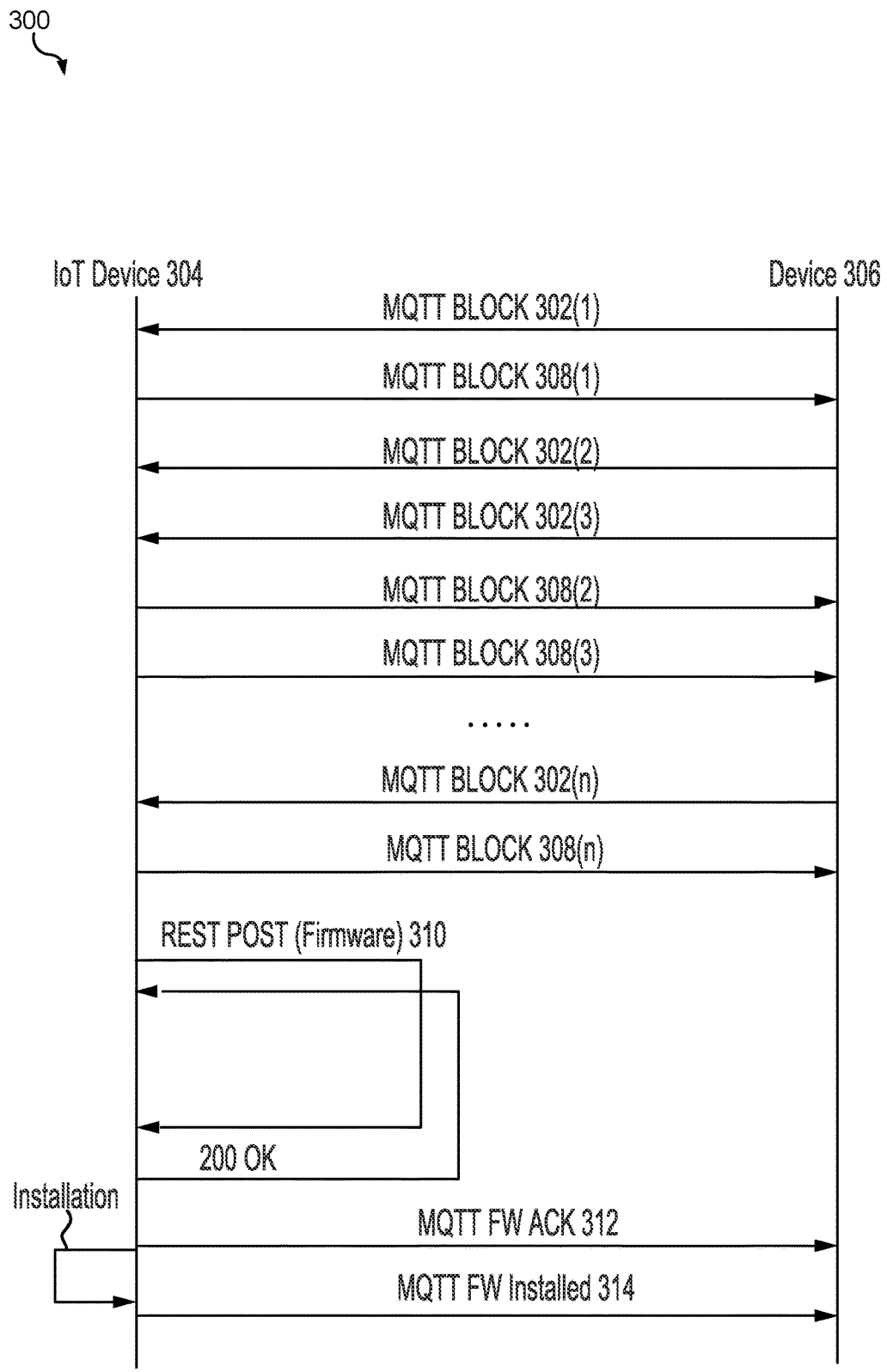
FIG. 3 is a sequence diagram of an example of an efficient update in an IoT event driven architecture with REST support, according to some implementations.

FIG. 3 is a sequence diagram of an example of an efficient update in an IoT event driven architecture with REST support, according to some implementations. As illustrated in FIG. 3, a plurality of MQTT blocks 302(1)-(*n*) corresponding to a file (e.g., a file 128) may be transmitted by an application device 304 (e.g., a management device 106) to an IoT device 306 (e.g., an IoT device 102), and the IoT device 306 may a send plurality of acknowledgements 308 in response to the plurality of MQTT blocks 302(1)-(*n*). As described with respect to FIG. 1, each of the plurality of MQTT blocks 302(1)-(*n*) may include a file portion (e.g., a file portion 126), and a plurality of communication parameters (e.g., the communication parameters 130).

In some aspects, the file may be a firmware file. Further, once all of the blocks for the file are received, the file may be locally uploaded through a REST POST request 310 to a local address (e.g., the https://[localhost]/firmwareProcess URL where [localhost] specifies the loopback interface of the device (i.e. 127.0.0.1 for IPv4 or ::1 for IPv6)) and firmwareProcess indicates the path of the process uploading the firmware. In addition, in some aspects, the IoT device 306 may transmit MQTT FW ACK 312 to the application device 304 to specify that the firmware file was posted correctly, and initiates file installation. Further, once the file installation is complete, the IoT device 306 may transmit a MQTT FW installed 314 to the application device 304 to indicate that the firmware was installed correctly.

Figure 4:
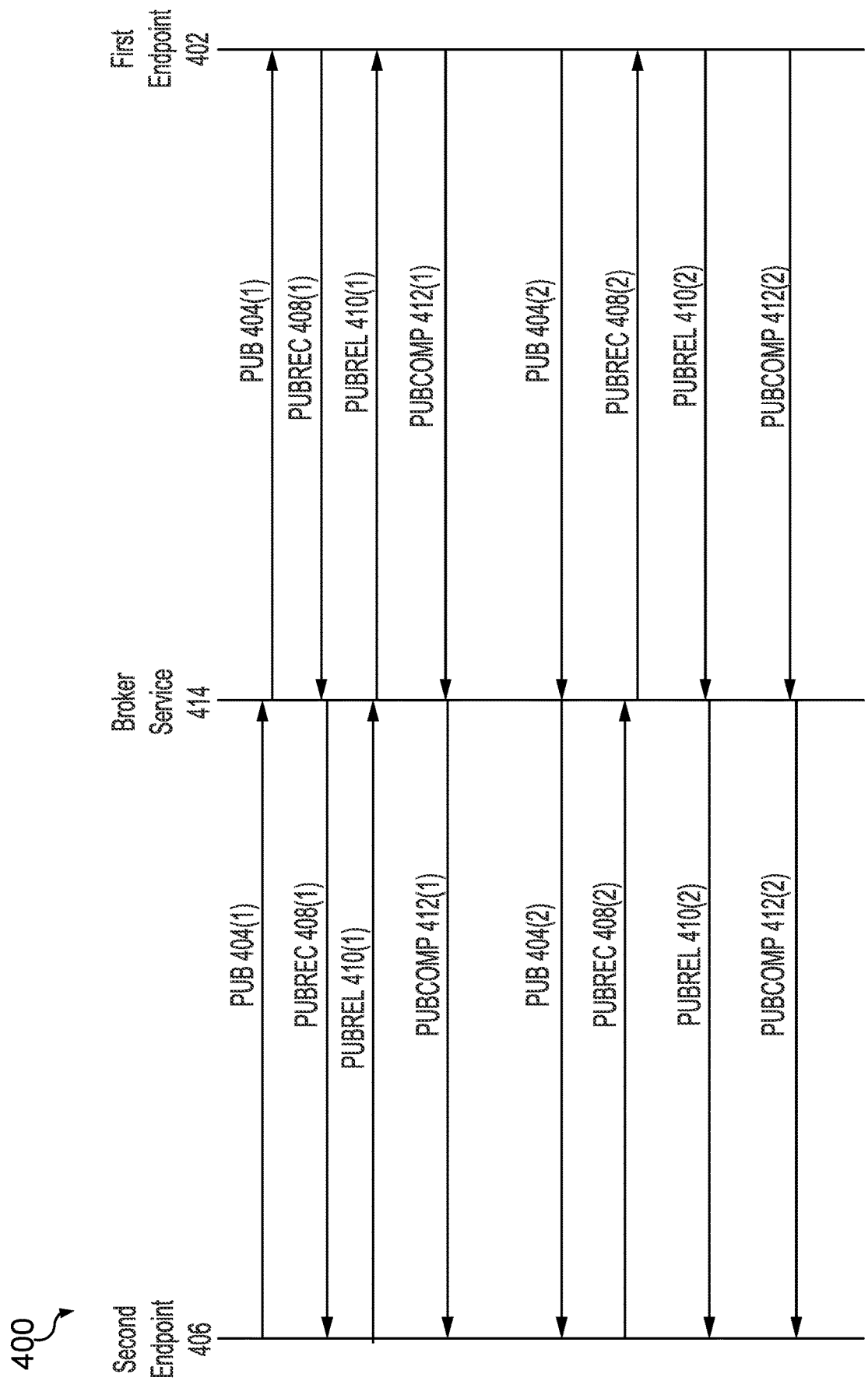
FIG. 4 is a sequence diagram of an example of an MQTT message exchange, according to some implementations.

FIG. 4 is a sequence diagram of an example of an MQTT message exchange, according to some implementations. As illustrated in FIG. 4, a publish/subscribe model (e.g., MQTT) may employ a message exchange 400 that relies on a dual handshake where a first endpoint 402 publishes a message (PUB 404) and a second endpoint 406 acknowledges by transmitting a publish receive message (PUBREC 408). The first endpoint 402 then releases the message from the second endpoint 406 by sending a publish release message (PUBREL 410). The second endpoint then responds by transmitting a publish complete message (PUBCOMP 412). Further, as described in detail herein, in some aspects, the first endpoint 402 and the second endpoint 406 may utilize a broker service 414 to communicate messages during the message exchange.

Figure 5:
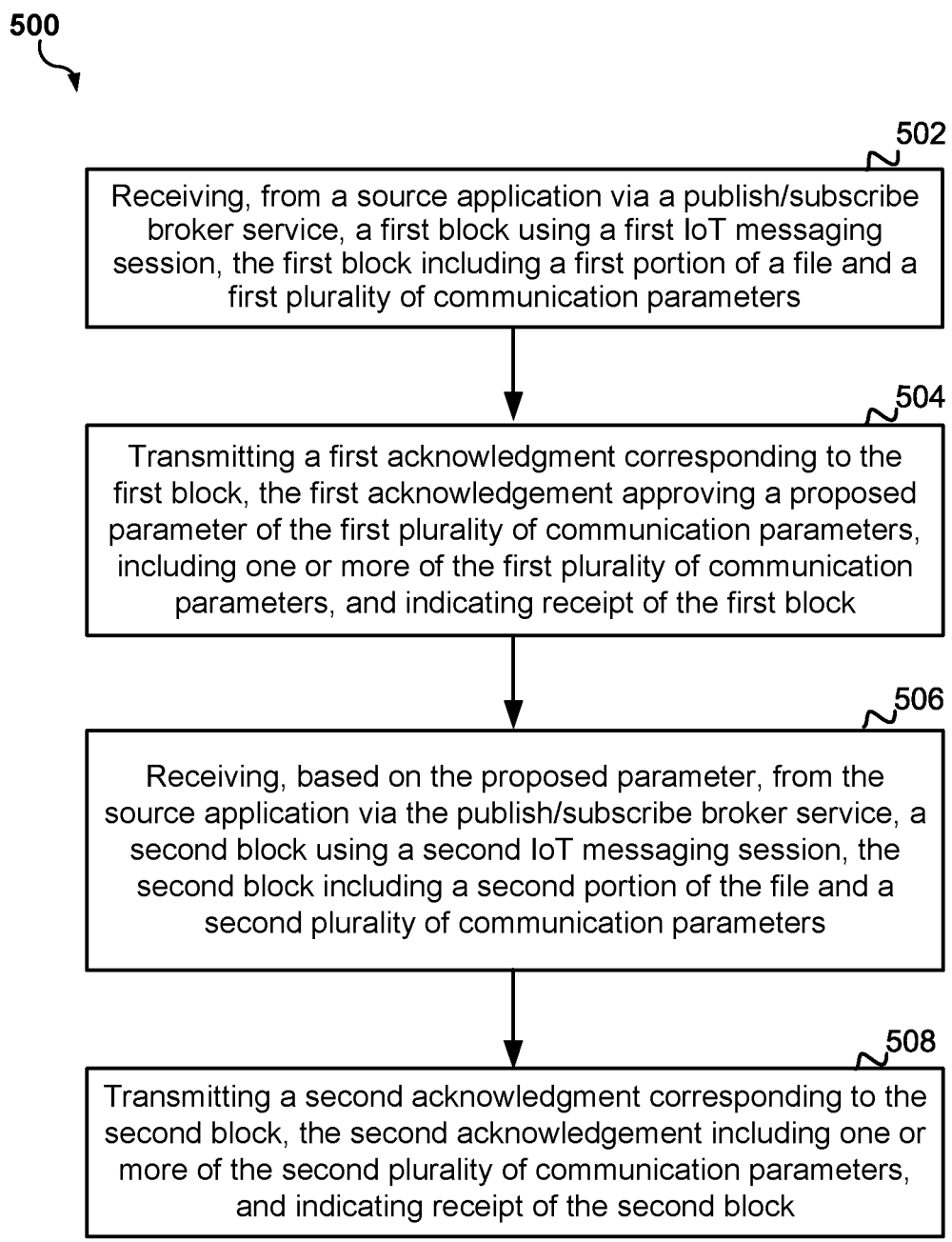
FIG. 5 is a flow diagram of an example method of employing an IoT device for efficient update in an IoT event driven architecture, according to some implementations.

Referring to FIG. 5, in operation, the IoT device 102 or computing device 600 may perform an example method 500 for efficient update in an IoT event driven architecture The method 500 may be performed by one or more components of the IoT device 102, the computing device 600, or any device/component described herein according to the techniques described with reference to FIGS. 1-4 and 6-8.

At block 502, the method 500 includes receiving, from a source application via a publish/subscribe broker service, a first block using a first IoT messaging session, the first block including a first portion of a file and a first plurality of communication parameters. For example, the IoT device 102 may receive the block 124(1) from the management device 106 via the broker service 110. Further the block 124 may include a file portion 126(1) of the file 128 and the communication parameters 130.

Accordingly, the management device 106 or the processor 602 executing the component 116 may provide means for receiving, from a source application via a publish/subscribe broker service, a first block using a first IoT messaging session, the first block including a first portion of a file and a first plurality of communication parameters.

At block 504, the method 500 includes transmitting a first acknowledgement corresponding to the first block, the first acknowledgement approving a proposed parameter of the first plurality of communication parameters, including one or more of the first plurality of communication parameters, and indicating receipt of the first block. For example, upon receipt of the block 124, the extension component 118 may determine whether a proposed parameter 136 other communication parameters a suitable for transmission of two or more blocks 124 including the file 128. If the extension component 118 determines that the proposed parameter 136 is suitable for transmission of the two or more blocks 124 including the file 128, the extension component 118 may generate an acknowledgement 132(1) and employ the messaging component 116 to transmit the acknowledgement 132(1) of the block 124 to the management device via the broker service 110. In some examples, the proposed parameter 136 may be a requested block size for the two or more blocks 124 including the file 128. Alternatively, if the extension component 118 determines that the proposed parameter 136 is unsuitable for transmission of the two or more blocks 124 including the file 128, the extension component 118 may generate a negative acknowledgement 134(1) and employ the messaging component 116 to transmit the acknowledgement 134(1) of the block 124 to the management device via the broker service 110.

Accordingly, the management device 106 or the processor 602 executing the extension component 118 and the messaging component 116 may provide means for transmitting a first acknowledgement corresponding to the first block, the first acknowledgement approving a proposed parameter of the first plurality of communication parameters, including one or more of the first plurality of communication parameters, and indicating receipt of the first block.

At block 506, the method 500 includes receiving, based on the proposed parameter, from the source application via the publish/subscribe broker service, a second block using a second IoT messaging session, the second block including a second portion of the file and a second plurality of communication parameters. For example, the IoT device 102 may receive the block 124(n) from the management device 106 via the broker service 110. Further the block 124 may include a file portion 126(n) of the file 128 and the communication parameters 130.

Accordingly, the management device 106 or the processor 602 executing the messaging component 116 may provide means for receiving, based on the proposed parameter, from the source application via the publish/subscribe broker service, a second block using a second IoT messaging session, the second block including a second portion of the file and a second plurality of communication parameters.

At block 508, the method 500 includes transmitting a second acknowledgement corresponding to the second block, the second acknowledgement including one or more of the second plurality of communication parameters, and indicating receipt of the second block. For example, the extension component 118 may generate an acknowledgement 132(n) and employ the messaging component 116 to transmit the acknowledgement 132(n) of the block 124(n) to the management device via the broker service 110. Further, in some aspects, the extension component 118 may determine that all of the blocks 124 for the file 128 and process the file 128. For example, the extension component 118 may reconstitute the file, and update the firmware component 114 using the file 128 or update the database 122 using the file 128.

Accordingly, the management device 106 or the processor 602 executing the extension component 118 and the messaging component 116 may provide means transmitting a second acknowledgement corresponding to the second block, the second acknowledgement including one or more of the second plurality of communication parameters, and indicating receipt of the second block.

In an alternative or additional aspect, the techniques described herein relate to a method 500, further including transmitting, to an internal address of the IoT device, a representational state transfer (REST) POST request in response to receiving the file, the POST request including POST data generated from the first portion and the second portion.

In an alternative or additional aspect, the techniques described herein relate to a method 500, further including implementing a firewall that permits the REST POST request to the internal address and denies REST POST requests to external addresses.

In an alternative or additional aspect, the techniques described herein relate to a method 500, wherein the file is firmware for the IoT device, and further includes: installing the firmware on the IoT device in response to confirming receipt of the file based on the first portion, the second portion, and a file size of the file.

In an alternative or additional aspect, the techniques described herein relate to a method 500, further including storing the first block directly to persistent memory upon receipt before combining the first block with the second block.

In an alternative or additional aspect, the techniques described herein relate to a method 500, wherein the proposed parameter is a first proposed parameter, and further including receiving, from the source application via the publish/subscribe broker service, a third block from the source application using a third IoT messaging session, the third block including a third portion of a file and a third plurality of communication parameters; generating a first proposed parameter in response to determining to reject a second proposed parameter of the third plurality of communication parameters; and transmitting a negative acknowledgement corresponding to the third block, the negative acknowledgement rejecting the second proposed parameter, and including the first proposed parameter as instruction for communication of the first block and the second block.

In an alternative or additional aspect, the techniques described herein relate to a method 500, wherein the first IoT messaging session and the second IoT messaging session are message queuing telemetry transport (MQTT) sessions.

In an alternative or additional aspect, the techniques described herein relate to a method 500, wherein the first IoT messaging session and the second IoT messaging session are event driven architecture (EDA) sessions.

In an alternative or additional aspect, the techniques described herein relate to a method 500, wherein the first plurality of communication parameters include at least one of a requested size of the first block, a message type identifier, a block identifier of the first block, a length of the first block, an offset position of first block within the file, and/or a target uniform resource locator.

In an alternative or additional aspect, the techniques described herein relate to a method 500, wherein the proposed parameter includes a requested size of the first block.

Figure 6:
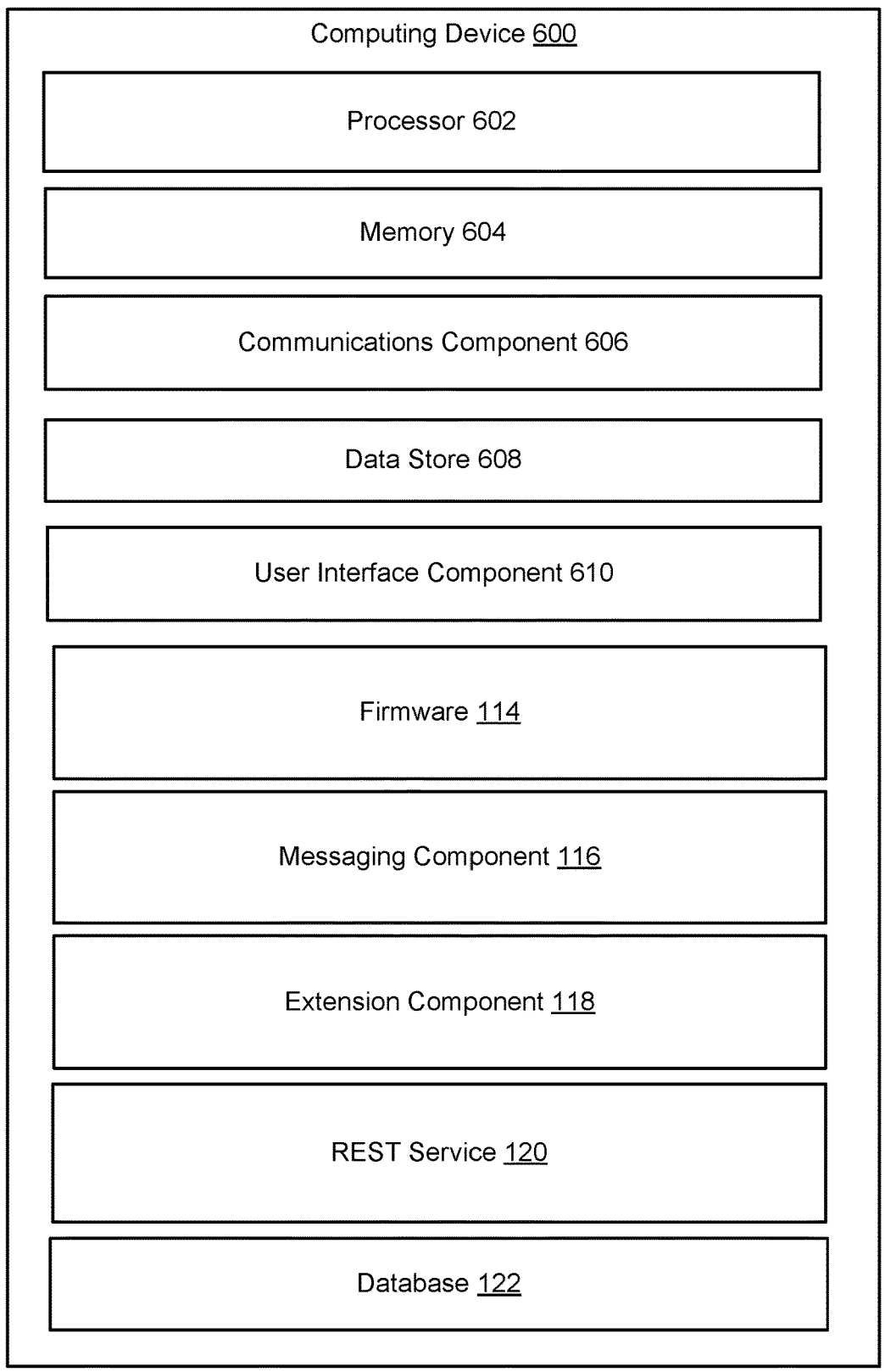
FIG. 6 is block diagram of an example of a IoT device configured to implement secure low-latency and low-throughput support of REST APIs in IoT devices, according to some implementations.

Referring to FIG. 6, a computing device 600 may implement all or a portion of the functionality described herein. The computing device 600 may be or may include or may be configured to implement the functionality of at least a portion of the system 100, or any component therein. For example, the computing device 600 may be or may include or may be configured to implement the functionality of the IoT devices 102. The computing device 600 includes a processor 602 which may be configured to execute or implement software, hardware, and/or firmware modules that perform any functionality described herein. For example, the processor 602 may be configured to execute or implement software, hardware, and/or firmware modules that perform any functionality described herein with reference to the IoT device 102 or any other component/system/device described herein.

The processor 602 may be a micro-controller, an application-specific integrated circuit (ASIC), a digital signal processor (DSP), or a field-programmable gate array (FPGA), and/or may include a single or multiple set of processors or multi-core processors. Moreover, the processor 602 may be implemented as an integrated processing system and/or a distributed processing system. The computing device 600 may further include a memory 604, such as for storing local versions of applications being executed by the processor 602, related instructions, parameters, etc. The memory 604 may include a type of memory usable by a computer, such as random access memory (RAM), read only memory (ROM), tapes, magnetic discs, optical discs, volatile memory, non-volatile memory, and any combination thereof. Additionally, the processor 602 and the memory 604 may include and execute an operating system executing on the processor 602, one or more applications, display drivers, and/or other components of the computing device 600.

Further, the computing device 600 may include a communications component 606 that provides for establishing and maintaining communications with one or more other devices, parties, entities, etc. utilizing hardware, software, and services. The communications component 606 may carry communications between components on the computing device 600, as well as between the computing device 600 and external devices, such as devices located across a communications network and/or devices serially or locally connected to the computing device 600. In an aspect, for example, the communications component 606 may include one or more buses, and may further include transmit chain components and receive chain components associated with a wireless or wired transmitter and receiver, respectively, operable for interfacing with external devices.

Additionally, the computing device 600 may include a data store 608, which can be any suitable combination of hardware and/or software, that provides for mass storage of information, databases, and programs. For example, the data store 608 may be or may include a data repository for applications and/or related parameters not currently being executed by processor 602. In addition, the data store 608 may be a data repository for an operating system, application, display driver, etc., executing on the processor 602, and/or one or more other components of the computing device 600.

The computing device 600 may also include a user interface component 610 operable to receive inputs from a user of the computing device 600 and further operable to generate outputs for presentation to the user (e.g., via a display interface to a display device). The user interface component 610 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 610 may include one or more output devices, including but not limited to a display interface, a speaker, a haptic feedback mechanism, a printer, any other mechanism capable of presenting an output to a user, or any combination thereof.

Figure 7:
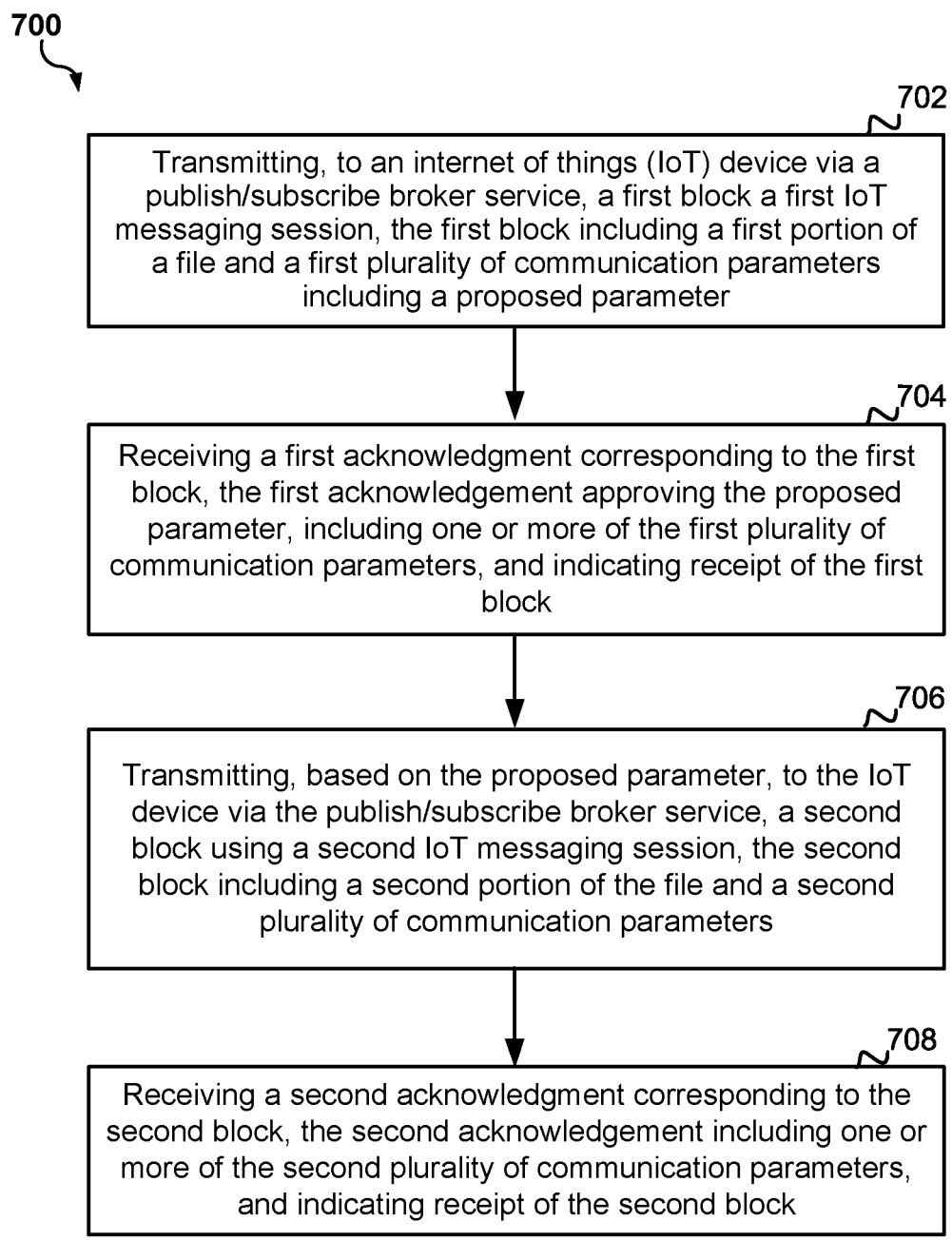
FIG. 7 is a flow diagram of an example method of employing a management device for efficient update in an IoT event driven architecture, according to some implementations.

Referring to FIG. 7, in operation, the management device 106 or computing device 800 may perform an example method 700 for efficient update in an IoT event driven architecture. The method 700 may be performed by one or more components of the management device 106, the computing device 800, or any device/component described herein according to the techniques described with reference to FIGS. 1-6 and 8.

At block 702, the method 700 includes transmitting, to an internet of things (IoT) device via a publish/subscribe broker service, a first block a first IoT messaging session, the first block including a first portion of a file and a first plurality of communication parameters including a proposed parameter. For example, the management device 106 may transmit the block 124(1) to the IoT device 102 via the broker service 110. Further, the block 124 may include a file portion 126(1) of the file 128 and the communication parameters 130 generated by the extension component 142. In some aspects, the proposed parameter 136 may be a requested block size for the two or more blocks 124 including the file 128.

Accordingly, the management device 106 or the processor 802 executing the extension component 142 and the messaging component 140 may provide means for transmitting, to an internet of things (IoT) device via a publish/subscribe broker service, a first block a first IoT messaging session, the first block including a first portion of a file and a first plurality of communication parameters including a proposed parameter.

At block 704, the method 700 includes receiving a first acknowledgement corresponding to the first block, the first acknowledgement approving the proposed parameter, including one or more of the first plurality of communication parameters, and indicating receipt of the first block. For example, the messaging component 140 may receive the acknowledgement 132(1) of the block 124(1) from the IoT device 102 via the broker service 110.

Accordingly, the management device 106 or the processor 802 executing the messaging component 140 may provide means for receiving a first acknowledgement corresponding to the first block, the first acknowledgement approving the proposed parameter, including one or more of the first plurality of communication parameters, and indicating receipt of the first block.

At block 706, the method 700 includes transmitting, based on the proposed parameter, to the IoT device via the publish/subscribe broker service, a second block using a second IoT messaging session, the second block including a second portion of the file and the second plurality of communication parameters. For example, the management device 106 may transmit the block 124(*n*) to the IoT device 102 via the broker service 110. Further, the block 124 may include a file portion 126(*n*) of the file 128 and the communication parameters 130 generated by the extension component 142.

Accordingly, the management device 106 or the processor 802 executing the extension component 142 and the messaging component 140 may provide means for transmitting, based on the proposed parameter, to the IoT device via the publish/subscribe broker service, a second block using a second IoT messaging session, the second block including a second portion of the file and the second plurality of communication parameters.

At block 708, the method 700 includes receiving a second acknowledgement corresponding to the second block, the second acknowledgement including one or more of the second plurality of communication parameters, and indicating receipt of the second block. For example, the messaging component 140 may receive the acknowledgement 132(*n*) of the block 124(*n*) from the IoT device 102 via the broker service 110.

Accordingly, the management device 106 or the processor 802 executing the messaging component 140 may provide means receiving a second acknowledgement corresponding to the second block, the second acknowledgement including one or more of the second plurality of communication parameters, and indicating receipt of the second block.

In an alternative or additional aspect, the techniques described herein relate to a method 700, further include transmitting, to the IoT device via the publish/subscribe broker service, a third block from the using a third IoT messaging session, the third block including a third portion of a file and a third plurality of communication parameters; and receive a negative acknowledgement corresponding to the third block, the negative acknowledgement rejecting the second proposed parameter, and including the first proposed parameter as instruction for communication of the first block and the second block.

In an alternative or additional aspect, the techniques described herein relate to a method 700, further including splitting the file into a plurality of file portions based upon the proposed parameter, the plurality of file portions including the first portion of the file and the second portion of the file.

In an alternative or additional aspect, the techniques described herein relate to a method 700, wherein the first IoT messaging session and the second IoT messaging session are message queuing telemetry transport (MQTT) sessions.

In an alternative or additional aspect, the techniques described herein relate to a method 700, wherein the first IoT messaging session and the second IoT messaging session are event driven architecture (EDA) sessions.

In an alternative or additional aspect, the techniques described herein relate to a method 700, wherein the first plurality of communication parameters include at least one of a requested size of the first block, a message type identifier, a block identifier of the first block, a length of the first block, an offset position of first block within the file, and/or a target uniform resource locator.

In an alternative or additional aspect, the techniques described herein relate to a method 700, wherein the proposed parameter includes a requested size of the first block.

Figure 8:
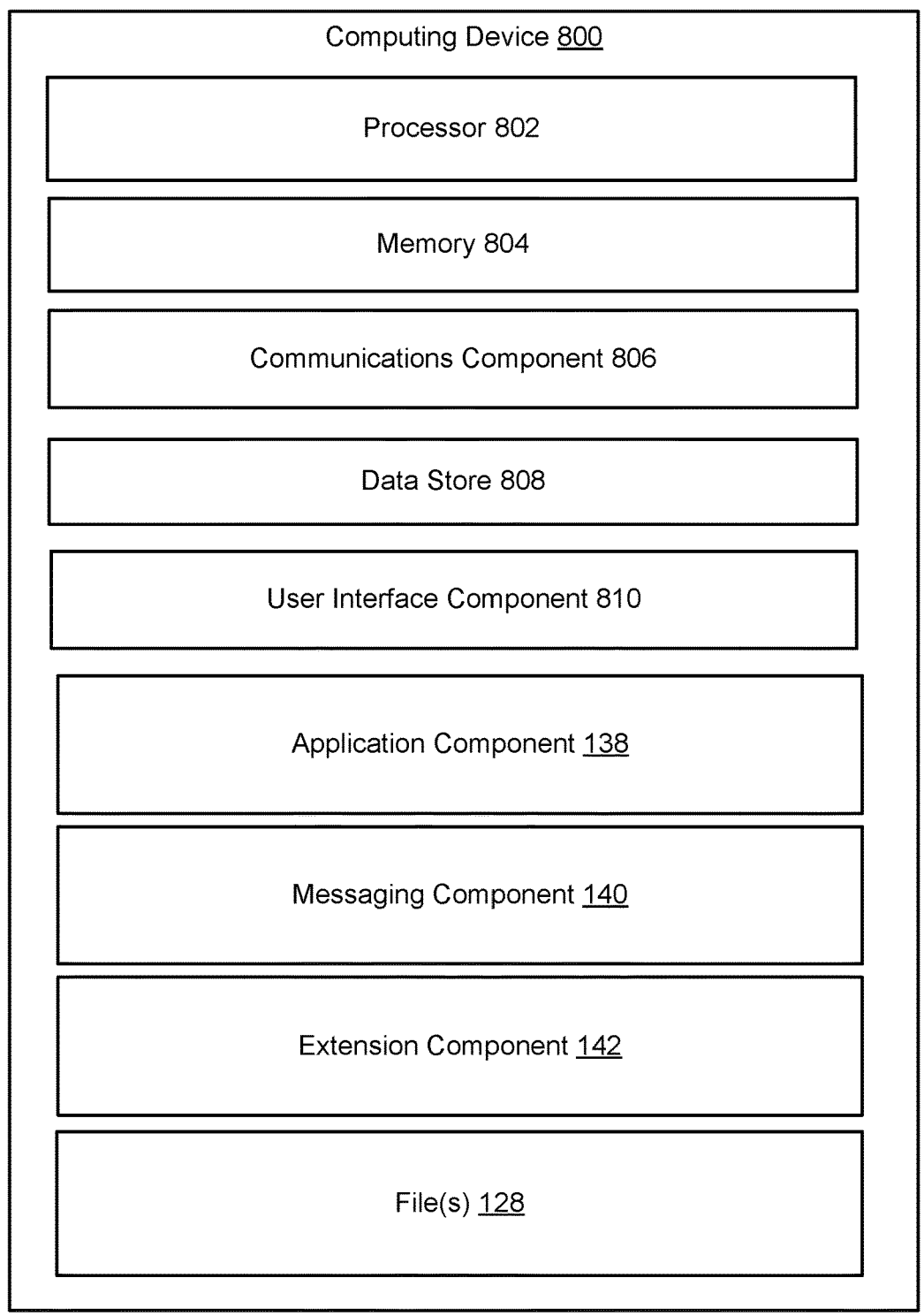
FIG. 8 is block diagram of an example of a management device configured to implement efficient update in an IoT event driven architecture, according to some implementations.

Referring to FIG. 8, a computing device 800 may implement all or a portion of the functionality described herein. The computing device 800 may be or may include or may be configured to implement the functionality of at least a portion of the system 100, or any component therein. For example, the computing device 800 may be or may include or may be configured to implement the functionality of the management devices 106. The computing device 800 includes a processor 802 which may be configured to execute or implement software, hardware, and/or firmware modules that perform any functionality described herein. For example, the processor 802 may be configured to execute or implement software, hardware, and/or firmware modules that perform any functionality described herein with reference to the management device 106 or any other component/system/device described herein.

The processor 802 may be a micro-controller, an application-specific integrated circuit (ASIC), a digital signal processor (DSP), or a field-programmable gate array (FPGA), and/or may include a single or multiple set of processors or multi-core processors. Moreover, the processor 802 may be implemented as an integrated processing system and/or a distributed processing system. The computing device 800 may further include a memory 804, such as for storing local versions of applications being executed by the processor 802, related instructions, parameters, etc. The memory 804 may include a type of memory usable by a computer, such as random access memory (RAM), read only memory (ROM), tapes, magnetic discs, optical discs, volatile memory, non-volatile memory, and any combination thereof. Additionally, the processor 802 and the memory 804 may include and execute an operating system executing on the processor 802, one or more applications, display drivers, and/or other components of the computing device 800.

Further, the computing device 800 may include a communications component 806 that provides for establishing and maintaining communications with one or more other devices, parties, entities, etc. utilizing hardware, software, and services. The communications component 806 may carry communications between components on the computing device 800, as well as between the computing device 800 and external devices, such as devices located across a communications network and/or devices serially or locally connected to the computing device 800. In an aspect, for example, the communications component 806 may include one or more buses, and may further include transmit chain components and receive chain components associated with a wireless or wired transmitter and receiver, respectively, operable for interfacing with external devices.

Additionally, the computing device 800 may include a data store 808, which can be any suitable combination of hardware and/or software, that provides for mass storage of information, databases, and programs. For example, the data store 808 may be or may include a data repository for applications and/or related parameters not currently being executed by processor 802. In addition, the data store 808 may be a data repository for an operating system, application, display driver, etc., executing on the processor 802, and/or one or more other components of the computing device 800.

The computing device 800 may also include a user interface component 810 operable to receive inputs from a user of the computing device 800 and further operable to generate outputs for presentation to the user (e.g., via a display interface to a display device). The user interface component 810 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 810 may include one or more output devices, including but not limited to a display interface, a speaker, a haptic feedback mechanism, a printer, any other mechanism capable of presenting an output to a user, or any combination thereof.

What is claimed is:

1. A method performed by an Internet of things (IoT) device, the method comprising:
   receiving, from a source application via a publish/subscribe broker service, a first block using a first IoT messaging session, the first block including a first portion of a file and a first plurality of communication parameters;
   transmitting a first acknowledgement corresponding to the first block, the first acknowledgement approving a proposed parameter of the first plurality of communication parameters, including one or more of the first plurality of communication parameters, and indicating receipt of the first block;
   receiving, based on the proposed parameter, from the source application via the publish/subscribe broker service, a second block using a second IoT messaging session, the second block including a second portion of the file and a second plurality of communication parameters; and
   transmitting a second acknowledgement corresponding to the second block, the second acknowledgement including one or more of the second plurality of communication parameters, and indicating receipt of the second block.

2. The method of claim 1, further comprising transmitting, to an internal address of the IoT device, a representational state transfer (REST) POST request in response to receiving the file, the REST POST request including POST data generated from the first portion and the second portion.

3. The method of claim 2, further comprising implementing a firewall that permits the REST POST request to the internal address and denies REST POST requests to external addresses.

4. The method of claim 1, wherein the file is firmware for the IoT device, and further comprises:
   installing the firmware on the IoT device in response to confirming receipt of the file based on the first portion, the second portion, and a file size of the file.

5. The method of claim 1, further comprising:
   storing the first block directly to persistent memory upon receipt before combining the first block with the second block.

6. The method of claim 1, wherein the proposed parameter is a first proposed parameter, and further comprising:
   receiving, from the source application via the publish/subscribe broker service, a third block from the source application using a third IoT messaging session, the third block including a third portion of a file and a third plurality of communication parameters;
   generating a first proposed parameter in response to determining to reject a second proposed parameter of the third plurality of communication parameters; and
   transmitting a negative acknowledgement corresponding to the third block, the negative acknowledgement rejecting the second proposed parameter, and including the first proposed parameter as instruction for communication of the first block and the second block.

7. The method of claim 1, wherein the first IoT messaging session and the second IoT messaging session are message queuing telemetry transport (MQTT) sessions.

8. The method of claim 5, wherein the first IoT messaging session and the second IoT messaging session are event driven architecture (EDA) sessions.

9. The method of claim 1, wherein the first plurality of communication parameters include at least one of a requested size of the first block, a message type identifier, a block identifier of the first block, a length of the first block, an offset position of first block within the file, and/or a target uniform resource locator.

10. The method of claim 1, wherein the proposed parameter includes a requested size of the first block.

11. A system comprising:
    a memory storing instructions thereon; and
    at least one processor coupled to the memory and configured by the instructions to:
      receive, from a source application via a publish/subscribe broker service, a first block using a first IoT messaging session, the first block including a first portion of a file and a first plurality of communication parameters;
      transmit a first acknowledgement corresponding to the first block, the first acknowledgement approving a proposed parameter of the first plurality of communication parameters, including one or more of the first plurality of communication parameters, and indicating receipt of the first block;
      receive, based on the proposed parameter, from the source application via the publish/subscribe broker service, a second block using a second IoT messaging session, the second block including a second portion of the file and a second plurality of communication parameters; and
      transmit a second acknowledgement corresponding to the second block, the second acknowledgement including one or more of the second plurality of communication parameters, and indicating receipt of the second block.

12. The system of claim 11, wherein the at least one processor is configured by the instructions to:
    transmit, to an internal address of the system, a representational state transfer (REST) POST request in response to receiving the file, the REST POST request including POST data generated from the first portion and the second portion.

13. The system of claim 12, wherein the at least one processor is configured by the instructions to:
    implement a firewall that permits the REST POST request to the internal address and denies REST POST requests to external addresses.

14. The system of claim 11, wherein the file is firmware for the system, and the at least one processor is configured by the instructions to:
    install the firmware on the system in response to confirming receipt of the file based on the first portion, the second portion, and a file size of the file.

15. The system of claim 11, wherein the proposed parameter is a first proposed parameter, and the at least one processor is configured by the instructions to:
- receive, from the source application via the publish/subscribe broker service, a third block from the source application using a third IoT messaging session, the third block including a third portion of a file and a third plurality of communication parameters;
- generate a first proposed parameter in response to determining to reject a second proposed parameter of the third plurality of communication parameters; and
- transmit a negative acknowledgement corresponding to the third block, the negative acknowledgement rejecting the second proposed parameter, and including the first proposed parameter as instruction for communication of the first block and the second block.

16. The system of claim 11, wherein the first plurality of communication parameters include at least one of a requested size of the first block, a message type identifier, a block identifier of the first block, a length of the first block, an offset position of first block within the file, and/or a target uniform resource locator.

17. The system of claim 11, wherein the proposed parameter includes a requested size of the first block.

18. A non-transitory computer-readable device having instructions thereon that, when executed by at least one computing device, causes the at least one computing device to perform operations comprising:
- transmitting, to an internet of things (IoT) device via a publish/subscribe broker service, a first block a first IoT messaging session, the first block including a first portion of a file and a first plurality of communication parameters including a proposed parameter;
- receiving a first acknowledgement corresponding to the first block, the first acknowledgement approving the proposed parameter, including one or more of the first plurality of communication parameters, and indicating receipt of the first block;
- transmitting, based on the proposed parameter, to the IoT device via the publish/subscribe broker service, a second block using a second IoT messaging session, the second block including a second portion of the file and a second plurality of communication parameters; and
- receiving a second acknowledgement corresponding to the second block, the second acknowledgement including one or more of the second plurality of communication parameters, and indicating receipt of the second block.

19. The non-transitory computer-readable device of claim 18, wherein the operations further comprise:
- transmit, to the IoT device via the publish/subscribe broker service, a third block from the using a third IoT messaging session, the third block including a third portion of a file and a third plurality of communication parameters; and
- receive a negative acknowledgement corresponding to the third block, the negative acknowledgement rejecting the second proposed parameter, and including the first proposed parameter as instruction for communication of the first block and the second block.

20. The non-transitory computer-readable device of claim 18, wherein the operations further comprise splitting the file into a plurality of file portions based upon the proposed parameter, the plurality of file portions including the first portion of the file and the second portion of the file.

* * * * *